US006579205B2

(12) United States Patent
Williams

(10) Patent No.: US 6,579,205 B2
(45) Date of Patent: Jun. 17, 2003

(54) FULL-TIME TRANSFER CASE WITH SYNCHRONIZED RANGE SHIFT AND CONTROLLABLE BI-DIRECTIONAL CLUTCH

(75) Inventor: Randolph C. Williams, Weedsport, NY (US)

(73) Assignee: New Venture Gear, Inc., Troy, MI (US)

( * ) Notice: Subject to any disclaimer, the term of this patent is extended or adjusted under 35 U.S.C. 154(b) by 30 days.

(21) Appl. No.: 10/053,128

(22) Filed: Nov. 13, 2001

(65) Prior Publication Data

US 2003/0092528 A1 May 15, 2003

(51) Int. Cl.⁷ ............................................. F16H 37/08
(52) U.S. Cl. ....................... 475/204; 475/298; 475/320
(58) Field of Search ................................ 475/204, 298, 475/303, 320

(56) References Cited

U.S. PATENT DOCUMENTS

| | | | |
|---|---|---|---|
| 4,063,470 A | * 12/1977 | Kelbel ........................ 475/320 |
| 4,103,753 A | * 8/1978 | Holdeman .................. 475/298 |
| 4,770,280 A | 9/1988 | Frost | |
| 5,078,660 A | 1/1992 | Williams et al. ............. 475/84 |
| 5,284,068 A | 2/1994 | Frost ..................... 74/665 GA |
| 5,323,871 A | 6/1994 | Wilson et al. ............. 180/197 |
| 5,346,442 A | 9/1994 | Eastman ..................... 475/223 |
| 5,411,447 A | 5/1995 | Frost .......................... 475/223 |
| 5,582,263 A | 12/1996 | Varma et al. .............. 180/247 |
| 5,651,749 A | 7/1997 | Wilson et al. ............. 475/221 |
| 5,655,986 A | 8/1997 | Wilson et al. ............. 475/204 |
| 5,697,861 A | 12/1997 | Wilson ....................... 475/198 |
| 5,700,222 A | 12/1997 | Bowen ....................... 475/204 |
| 5,702,321 A | 12/1997 | Bakowski et al. .......... 475/199 |
| 5,704,867 A | 1/1998 | Bowen ....................... 475/221 |
| 5,836,847 A | 11/1998 | Pritchard ................... 475/204 |
| 5,902,205 A | 5/1999 | Williams .................... 475/204 |
| 5,924,510 A | 7/1999 | Itoh et al. ................... 180/197 |
| 5,947,858 A | 9/1999 | Williams .................... 475/206 |
| 5,951,428 A | 9/1999 | Itoh et al. ................... 475/204 |
| 5,951,429 A | 9/1999 | Eastman ..................... 475/204 |
| 6,022,289 A | 2/2000 | Francis ...................... 475/320 |
| 6,056,666 A | 5/2000 | Williams .................... 475/320 |
| 6,092,635 A | 7/2000 | McCarthy et al. ............ 192/45 |
| 6,113,512 A | 9/2000 | Williams .................... 475/204 |
| 6,123,183 A | 9/2000 | Ito et al. .................... 192/220 |
| 6,132,332 A | 10/2000 | Yasui ........................... 477/36 |
| 6,152,848 A | 11/2000 | Williams et al. ............ 475/204 |
| 6,186,298 B1 | 2/2001 | Wake ............................ 192/38 |
| 6,283,887 B1 | 9/2001 | Brown et al. ............... 475/204 |
| 6,398,688 B2 * | 6/2002 | Brown et al. ............... 475/204 |
| 6,409,000 B1 | 6/2002 | Ioth et al. .................... 192/39 |
| 6,409,001 B1 | 6/2002 | Kerr ............................ 192/44 |

* cited by examiner

Primary Examiner—Sherry Estremsky
(74) Attorney, Agent, or Firm—Harness, Dickey & Pierce P.L.C.

(57) ABSTRACT

A full-time two-speed transfer case is equipped with an integrated planetary gearset assembly and a range shift mechanism to provide high-range and low-range drive connections. The integrated planetary gearset assembly includes a first gearset which acts as a two-speed reduction unit and a second gearset which acts as an interaxle differential. The synchronized range shift mechanism is arranged to concurrently move two components of the first gearset and can be synchronized to permit on-the-move range shifts. The transfer case is also equipped with a dual-mode bi-directional overrunning clutch and a mode shift mechanism to establish automatic full-time and locked four-wheel drive modes.

39 Claims, 13 Drawing Sheets

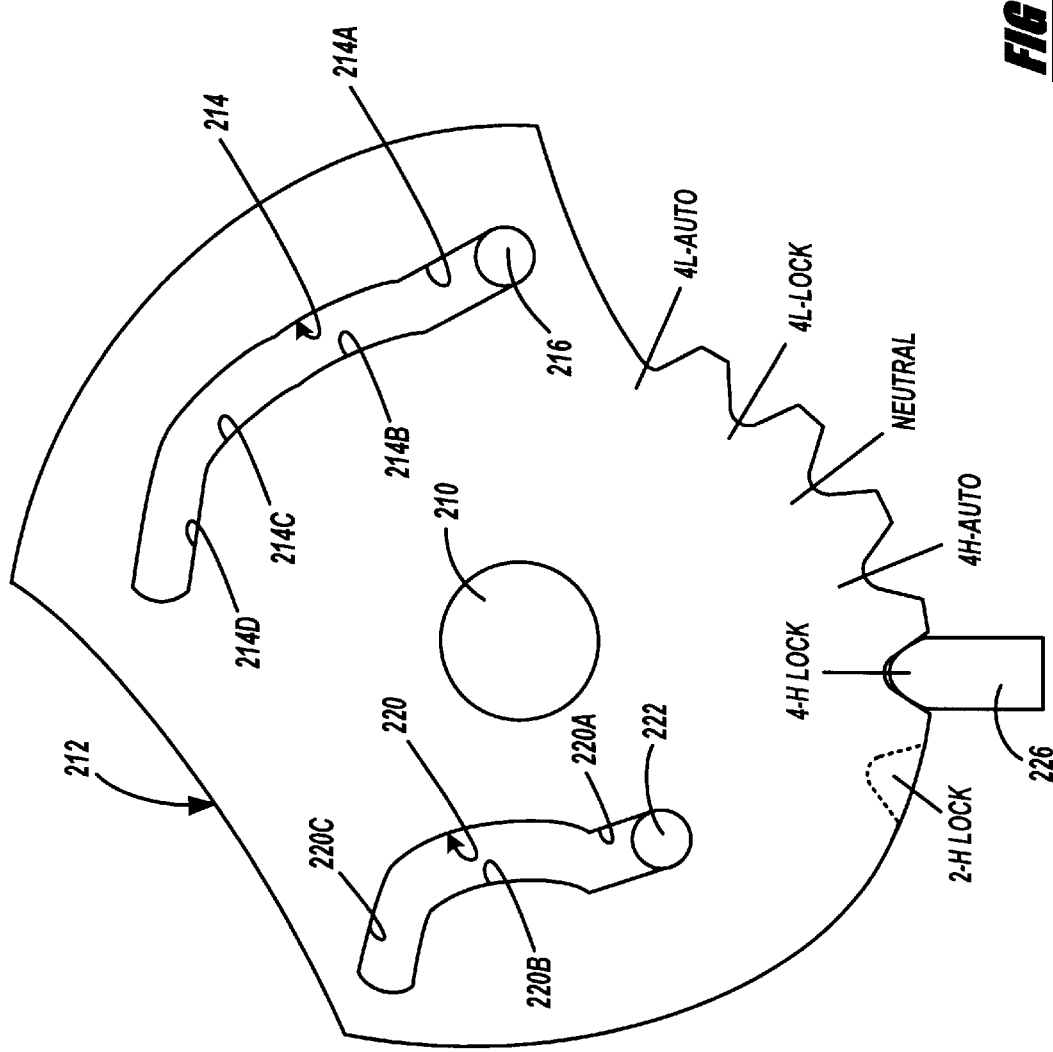

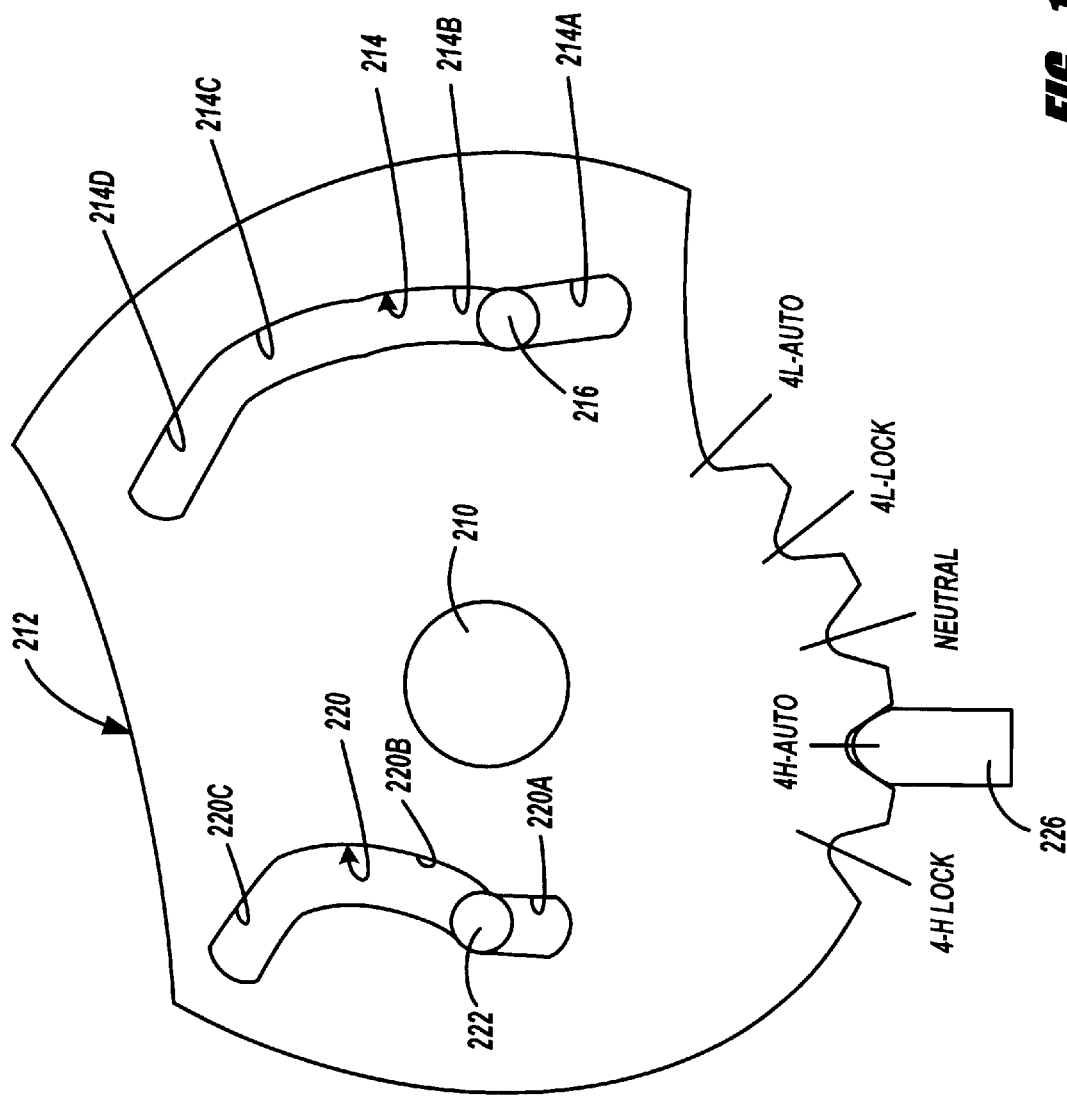

FULL-TIME TRANSFER CASE WITH SYNCHRONIZED RANGE SHIFT AND CONTROLLABLE BI-DIRECTIONAL CLUTCH

FIELD OF THE INVENTION

The present invention relates generally to a power transfer system for controlling the distribution of drive torque between the front and rear drivelines of a four-wheel drive vehicle. More particularly, the present invention relates to a full-time transfer case having a two-speed gear reduction unit and an interaxle differential integrated into a planetary gear assembly, a range shift mechanism for establishing high-range and low-range drive modes, and a controllable bidirectional overrunning clutch for controlling interaxle slip between the front and rear drivelines.

BACKGROUND OF THE INVENTION

Four-wheel drive vehicles are in great demand due to the enhanced on and off road traction control they provide. In many four-wheel drive vehicles, a transfer case is installed in the drivetrain and is normally operable to deliver drive torque to the primary driveline for establishing a two-wheel drive mode. The transfer case is further equipped with a clutch assembly that can be selectively or automatically actuated to transfer drive torque to the secondary driveline for establishing a four-wheel drive mode. These "mode" clutch assemblies can range from a simple dog clutch that is operable for mechanically shifting between the two-wheel drive mode and a "locked" (i.e., part-time) four-wheel drive mode to a more sophisticated automatically-actuated multi-plate clutch for providing an "on-demand" four-wheel drive mode.

On-demand four-wheel drive systems are able to provide enhanced traction and stability control and improved operator convenience since the drive torque is transferred to the secondary driveline automatically in response to lost traction at the primary driveline. An example of passively-controlled on-demand transfer case is shown in U.S. Pat. Nos. 5,704,863 where the amount of drive torque transferred through a pump-actuated clutch pack is regulated as a function of the interaxle speed differential. In contrast, actively-controlled on-demand transfer cases include a clutch actuator that is adaptively controlled by an electronic control unit in response to instantaneous vehicular operating characteristics detected by a plurality of vehicle sensors. U.S. Pat. Nos. 4,874,056, 5,363,938 and 5,407,024 disclose various examples of adaptive on-demand four-wheel drive systems.

As yet a further alternative, some vehicles are equipped with a full-time power transfer system having a transfer case with a center differential that functions to permit interaxle speed differentiation while transferring drive torque to both the front and rear drivelines. To minimize loss of traction due to wheel slip, most full-time transfer cases are also equipped with a clutch assembly for limiting speed differentiation and biasing the torque transferred across the center differential. Typically, the types of clutch assemblies used in full-time four-wheel drive systems to control interaxle slip across the center differential are similar to the passively and actively-controlled mode clutch assemblies used in on-demand four-wheel drive systems. Exemplary, full-time transfer cases are disclosed in commonly-owned U.S. Pat. Nos. 5,697,861 and 5,702,321.

Due to the cost and complexity associated with actively-controlled clutch assemblies, recent efforts have been directed to the use of overrunning clutches that can be easily controlled to provide various operating modes. For example, U.S. Pat. No. 5,993,592 illustrates a pawl-type controllable overrunning clutch assembly installed in a transfer case and which can be shifted between various drive modes. U.S. Pat. No. 6,092,635 discloses a hydraulically-actuated multi-function controllable overrunning clutch assembly that is noted to be operable for use in vehicular power transmission mechanisms. Likewise, U.S. Pat. Nos. 5,924,510, 5,951,428, 6,123,183, and 6,132,332 each disclose a controllable multi-mode overrunning clutch installed in a transfer case and which is actuated using an electromagnetic clutch. In view of this recent interest, a need exists to continue development of controllable bi-directional overrunning clutch assemblies which provide improved structure, robust operation, and reduced packaging for use in four-wheel drive transfer cases.

Finally, in an effort to minimize the overall size of full-time two-speed transfer cases, it has been proposed to incorporate the gear reduction unit and the interaxle differential into a common planetary gear assembly. For example, commonly-owned U.S. Pat. No. 5,902,205 discloses a full-time two-speed transfer case equipped with an integrated planetary gearset which is operable for establishing full-time high-range and low-range four-wheel drive modes through on-the-move shifting of a synchronized range shift mechanism. While such an arrangement provides a compact construction, there is a continuing need to develop alternatives which meet modern requirements for low noise and weight while advancing the state of the four-wheel drive art.

SUMMARY OF THE INVENTION

It is therefore an object of the present invention to provide a transfer case for a full-time four-wheel drive vehicle having a planetary gear assembly which integrates a two-speed gear reduction unit and an interaxle differential into a common arrangement.

As an additional object of the present invention, the full-time two-speed transfer case includes a range shift mechanism which can be selectively actuated for establishing a full-time four-wheel high-range drive mode, a neutral mode, and a full-time four-wheel low-range drive mode.

According to another object of the present invention, the full-time two-speed transfer case includes a controllable multi-mode bi-directional overrunning clutch assembly which is operably associated with the outputs of the planetary gear assembly for limiting speed differentiation and controlling the drive torque distribution therebetween in response to the occurrence of slip between the front and rear output shafts.

It is a further object of the present invention to provide a power-operated actuator to control shifting of the bi-directional overrunning clutch assembly between its distinct modes in response to mode signals received by a controller unit.

According a preferred embodiment of the present invention, the planetary gear assembly is operably installed between and input shaft and front and rear output shafts of the transfer case and is constructed in a compact arrangement. The planetary gear assembly includes a first planetary gearset and a second planetary gearset which are interconnected by a common carrier. The first planetary gearset is operably installed between the input shaft and the second planetary gearset for driving the carrier at either of a direct speed ratio (i.e., high-range) or a reduced speed ratio (i.e., low-range) relative to the input shaft. The carrier acts as the input to the second planetary gearset which has first and second outputs respectively connected to the rear and front output shafts of the transfer case. Thus, the second planetary gearset functions as an interaxle differential for permitting speed differentiation and distributing drive torque between the front and rear output shafts of the transfer case.

The present invention is also directed to integration of a controllable, multi-mode, bi-directional overrunning clutch assembly and a mode shift system into a full-time four-wheel drive transfer case for limiting slip between a primary output shaft and a secondary output shaft. The clutch assembly includes a first ring journalled on a first rotary member, a second ring fixed to a second rotary member; and a plurality of rollers disposed in opposed cam tracks formed between the first and second rings. The first ring is split to define an actuation channel having a pair of spaced end segments. An actuator ring is moveable between positions engaged with and released from the end segments of the first ring. The mode shift system is operable to control movement of the actuator ring for establishing an automatic four-wheel drive mode and a locked four-wheel drive mode.

In accordance with one particular embodiment of the bi-directional overrunning clutch assembly of the present invention, the first ring is journalled on a sprocket driven by the second output of the second planetary gearset and the second ring is driven by the rear output shaft. Thus, the invention provides for installing the controllable, multi-mode, bi-directional overrunning clutch assembly in association with the sprocket to permit significant axial length reductions for the transfer case.

Further objects, advantages and features of the present invention will become readily apparent to those skilled in the art by studying the following description of the preferred embodiment in conjunction with the appended drawings which are intended to set forth the best mode currently contemplated for carrying out the present invention.

BRIEF DESCRIPTION OF THE DRAWINGS

FIGS. 10A and 10B are side views of the drive mechanism used to coordinate actuation of the range shift mechanism and the mode shift mechanism for establishing various locked and full-time four-wheel drive modes;

DETAILED DESCRIPTION OF THE PREFERRED EMBODIMENTS

Figure 1:
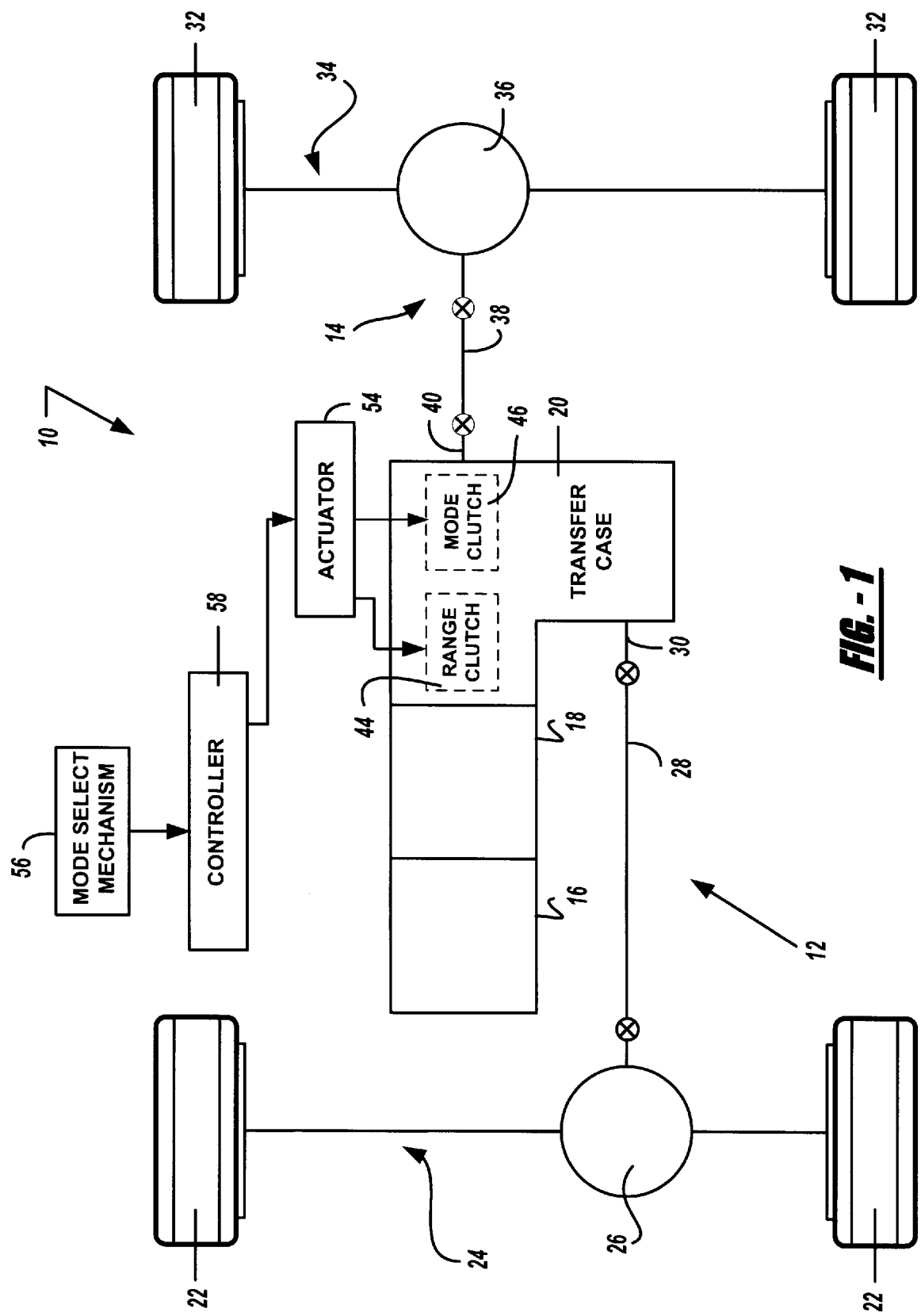
FIG. 1 is a schematic representation of a four-wheel drive motor vehicle equipped with a fulll-time power transfer system according to the present invention.
Figure 2:
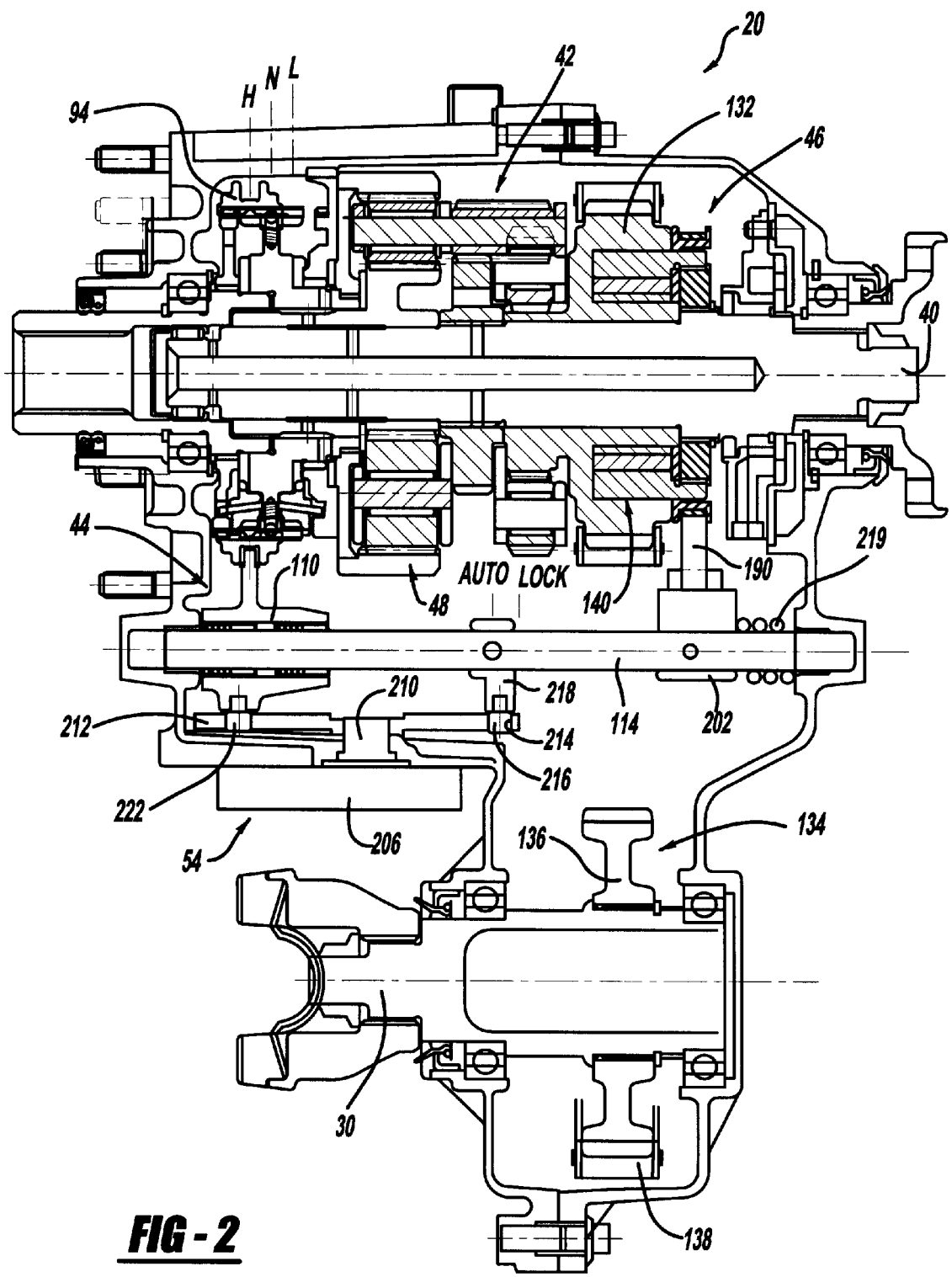
FIG. 2 is a sectional view of a full-time two-speed transfer case constructed according to a preferred embodiment of the present invention.
Figure 3:
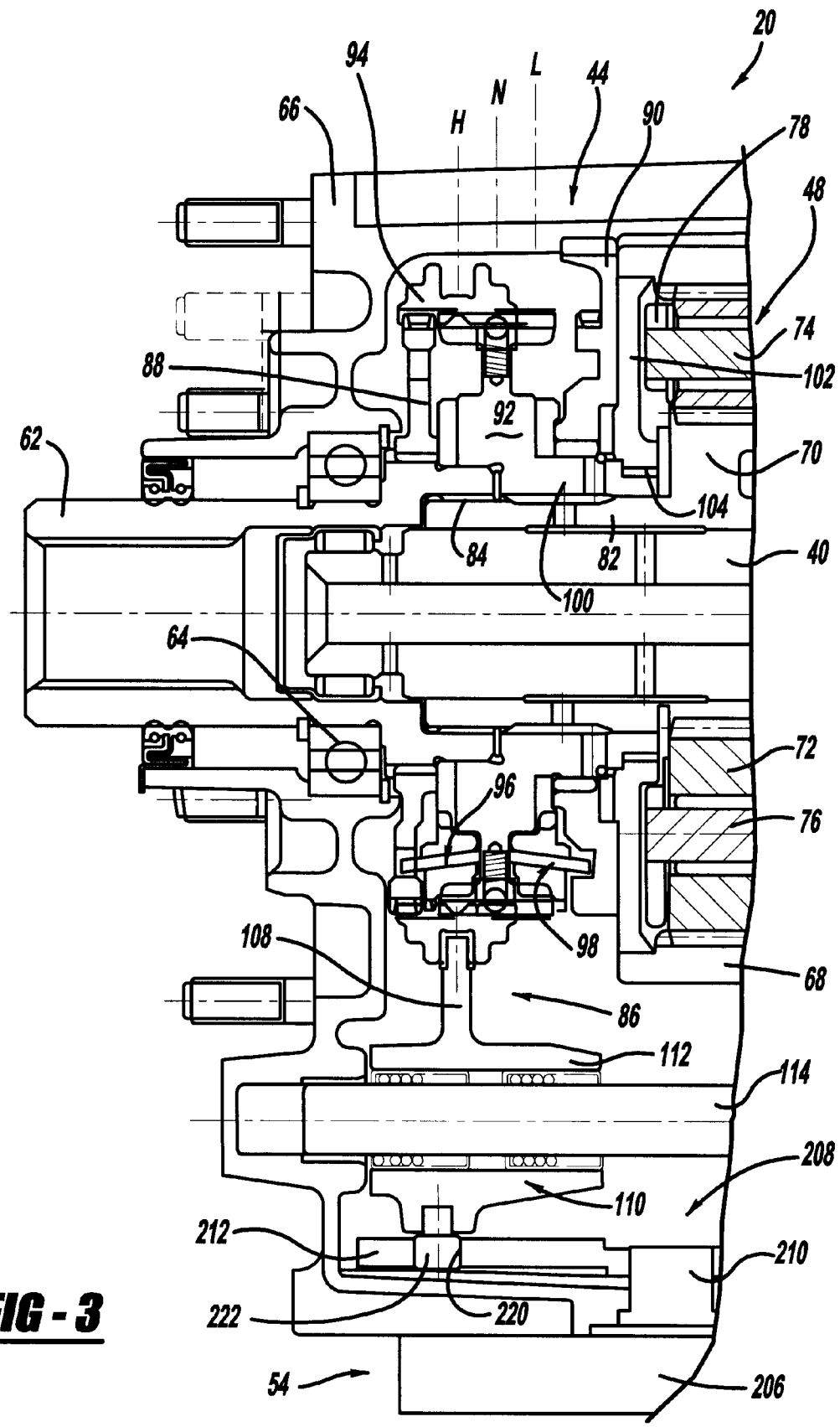
FIG. 3 is an enlarged partial view taken from FIG. 2 showing components of the integrated planetary gear assembly and the range shift mechanism in greater detail.
Figure 4:
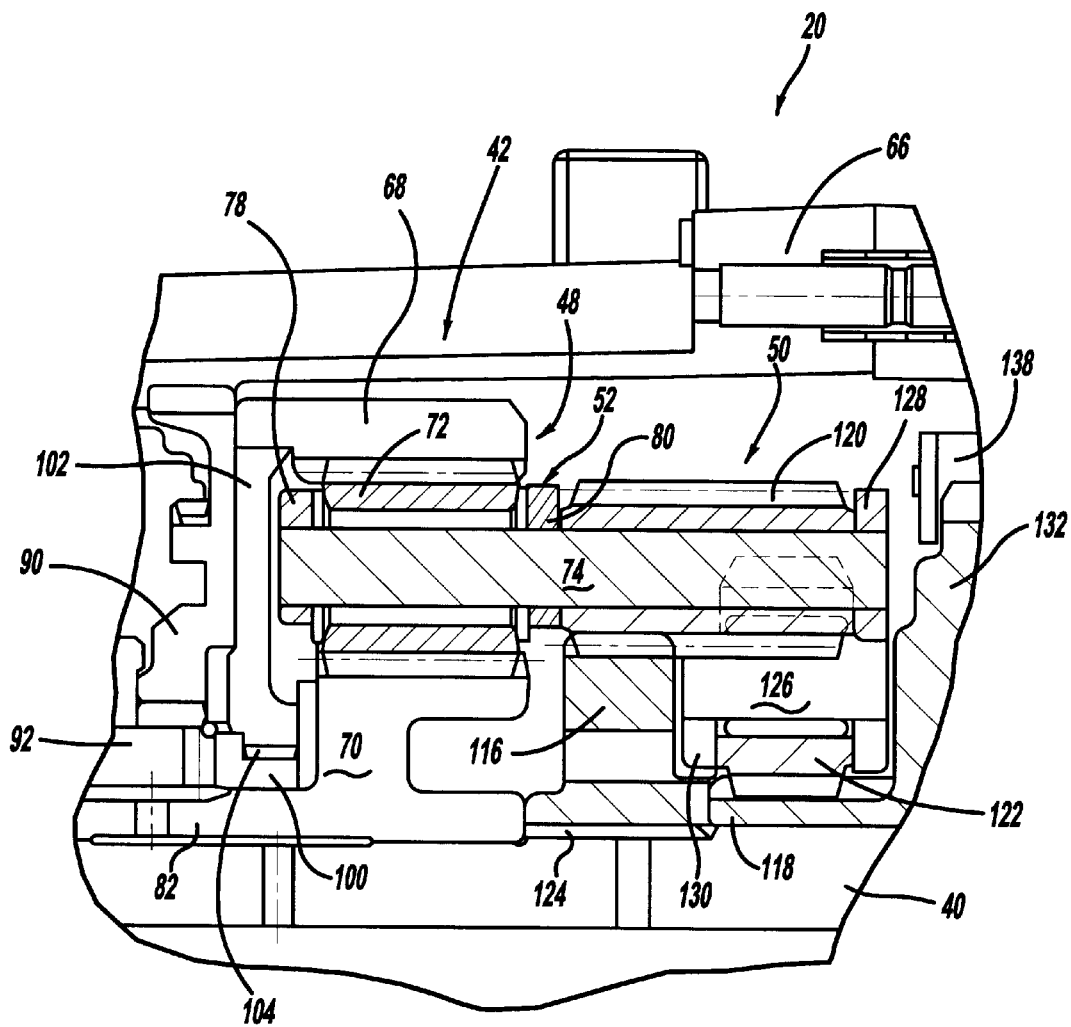
FIG. 4 is also an enlarged partial view of FIG. 2 showing the integrated planetary gear assembly.

Referring now to the drawings, a drivetrain for a full-time four-wheel drive vehicle is schematically shown interactively associated with a power transfer system 10 of the present invention. The motor vehicle drivetrain includes a front driveline 12 and a rear driveline 14 both driveable from a source of power, such as an engine 16, through a transmission 18 which may be of the manual or automatic type. In the particular embodiment shown, the drivetrain includes a transfer case 20 for transmitting drive torque from engine 16 and transmission 18 to front driveline 12 and rear driveline 14. Front driveline 12 includes a pair of front wheels 22 connected at opposite ends of a front axle assembly 24 having a front differential 26 coupled to one end of a front drive shaft 28, the opposite end of which is coupled to a front output shaft 30 of transfer case 20. Similarly, rear driveline 14 includes a pair of rear wheels 32 connected at opposite ends of a rear axle assembly 34 having a rear differential 36 coupled to one end of a rear drive shaft 38, the opposite end of which is interconnected to a rear output shaft 40 of transfer case 20.

As will be detailed hereinafter with greater specificity, transfer case 20 is equipped with a planetary gear assembly 42, a range clutch 44, and a mode clutch 46. Planetary gear assembly 42 includes a first planetary gearset 48 and a second planetary gearset 50 interconnected through a common carrier 52. Range clutch 44 is operable to couple components of first planetary gearset 48 for driving carrier 52 at either of a first (high-range) speed ratio or a second (low-range) speed ratio. Second planetary gearset 50 of planetary gear assembly 42 functions as an interaxle differential having carrier 52 as its input with other components thereof operably coupled to front output shaft 30 and rear output shaft 40. Additionally, mode clutch 46 is operable to control the magnitude of speed differentiation and torque distribution between rear output shaft 40 and front output shaft 30. Power transfer system 10 further includes a power-operated actuator 54 for controlling coordinated actuation of range clutch 44 and mode clutch 46, a mode select mechanism 56 operable to permit the vehicle operator to select one of the available drive modes, and a controller 58 for controlling actuation of actuator 54. In particular, controller 58 functions to control actuation of power-operated actuator 54 in response to the mode signal sent to controller 58 from mode select mechanism 56 for establishing the particular mode selected.

With particular reference now to FIG. 2 through 5 of the drawings, transfer case 20 is shown to include an input shaft 62 rotatably supported by a bearing assembly 64 from a housing 66. Input shaft 62 is adapted for connection to an output shaft of transmission 18. As noted, planetary gear assembly 42 includes a first gearset 48 interconnected to second gearset 50 via carrier 52. First gearset 48 includes a ring gear 68, a first sun gear 70, and a set of first planet gears 72 each meshed with ring gear 68 and first sun gear 70. Planet gears 72 are rotatably supported on long pins 74 and short pins 76, each of which extends between first and second carrier rings 78 and 80, respectively, of carrier 52. A stub shaft segment 82 of first sun gear 70 is shown fixed via a splined connection 84 for rotation with input shaft 62.

Range clutch 44 is shown to include a range shift mechanism 86 having a first clutch plate 88 fixed to input shaft 62, a second clutch plate 90 fixed to housing 66, a clutch hub 92 journalled on portions of input shaft 62 and stub shaft segment 82 of first sun gear 70, and a range sleeve 94 that is splined to clutch hub 92 for rotation therewith and axial sliding movement thereon between three distinct range positions. A non-synchronized version of range shift mechanism 86 is shown in the upper-half of FIG. 2. Preferably, however, range shift mechanism 86 is synchronized to permit "on-the-move" range shifts. Thus, a synchronized version of range shift mechanism 86 is shown in the lower-half of FIG. 2. This arrangement includes a first synchronizer 96 that is disposed between clutch hub 92 and first clutch plate 88, and a second synchronizer 98 disposed between clutch hub 92 and second clutch plate 90. Clutch hub 92 includes an axially extending shaft segment 100 that is journalled on stub shaft segment 82 of first sun gear 70. A plate segment 102 of ring gear 68 is coupled to shaft segment 100 of hub clutch 92 via a splined connection 104.

As noted, range sleeve 94 is moveable between three distinct range positions which are shown by phantom position lines to include a high-range ("H") position, a low-range ("L") position, and a neutral ("N") position. In addition, range shift mechanism 86 includes a range fork 110 which moves axially under the control of actuator 54 to control axial movement of range sleeve 94 between its three range positions. Range fork 110 includes a fork segment 108 that is shown retained in a groove formed in range sleeve 94. Range fork 110 also has a tubular segment 112 mounted on a shift rail 114, the opposite ends of which are retained for sliding movement in sockets formed in housing 66. As will be detailed, actuator 54 includes a drive mechanism which functions to move range fork 110 so as to cause corresponding axial movement of range sleeve 94 for establishing the different drive connections between input shaft 62 and carrier 52.

A first or high-range drive connection is established between input shaft 62 and carrier 52 when range sleeve 94 is in its H position. With range sleeve 94 in its H position, its internal clutch teeth are engaged with external clutch teeth on first clutch plate 88. Thus, ring gear 68, first sun gear 70 and carrier 52 are all commonly driven by input shaft 62. This establishes a direct speed ratio drive connection between input shaft 62 and carrier 52 such that first planet gears 72 are unloaded during operation of transfer case 20 in the high-range mode. This is a significant advantage over conventional two-speed planetary units since it eliminates concerns about fretting corrosion of the teeth on first planet gears 72 and permits use of quieter and smaller helical gears instead of conventional spur gears.

A second or low-range drive connection is established between input shaft 62 and carrier 52 when range sleeve 94 is in its L position. With range sleeve 94 in its L position, its internal clutch teeth are engaged with external clutch teeth formed on second clutch plate 90 such that ring gear 68 is braked against rotation. As such, carrier 52 is rotatively driven at a reduced speed relative to input shaft 62 due to ring gear 68 being braked. Finally, a neutral (non-driven) mode is established when range sleeve 94 is in its N position.

With range sleeve 94 in its N position, ring gear 68 is released from coupled engagement with both input shaft 62 and housing 66 such that no drive torque is delivered to carrier 52.

Second gearset 50 is a dual-planetary arrangement which functions as an interaxle differential to permit speed differentiation and distribute drive torque between front output shaft 30 and rear output shaft 40. Carrier 52, when driven at either of the high-range and low-range speed ratios, acts as the input to second gearset 50 which has its outputs coupled to output shafts 30 and 40. In particular, second gearset 50 includes a second sun gear 116, a third sun gear 118, a set of full-length second planet gears 120, and a set of half-length third planet gears 122. Second sun gear 116 is shown to be fixed via a splined connection 124 to rear output shaft 40 while third sun gear 118 is journally supported thereon. Second planet gears 120 are rotatably supported on long pins 74 while third planet gears 122 are rotatably supported on short pins 126. Long pins 74 are shown to extend between second carrier ring 80 and a third carrier ring 128 while short pins 126 are shown to extend between third carrier ring 128 and a fourth carrier ring 130. Second planet gears 120 are meshed with second sun gear 116 while third planet gears 122 are meshed with third sun gear 118. In addition, second and third planet gears 120 and 122 are circumferentially arranged in meshed pairs. According to the particular construction shown, second sun gear 116 acts as a first output of second gearset 50 while third sun gear 118 acts as the second output thereof. Third sun gear 118 is fixed to a drive sprocket 132 associated with a transfer assembly 134 that functions to transfer drive torque to front output shaft 30. In particular, drive sprocket 132 is arranged to transfer drive torque to a driven sprocket 136 that is fixed to front output shaft 30. A power chain 138 is shown to interconnect driven sprocket 136 to drive sprocket 132.

Figure 5:
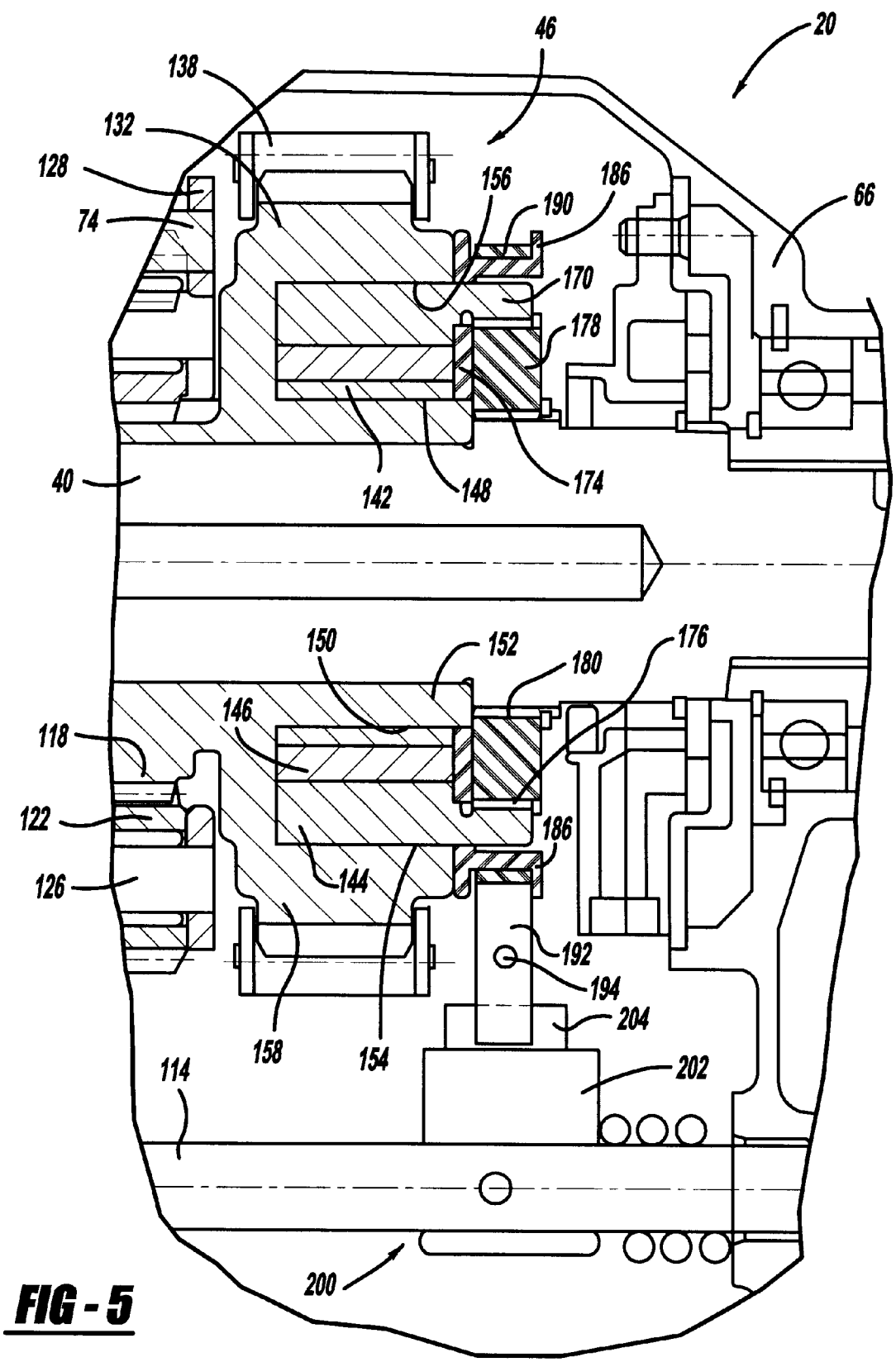
FIG. 5 is an enlarged partial view taken from FIG. 2 showing the components of the mode clutch assembly in greater detail.
Figure 6:
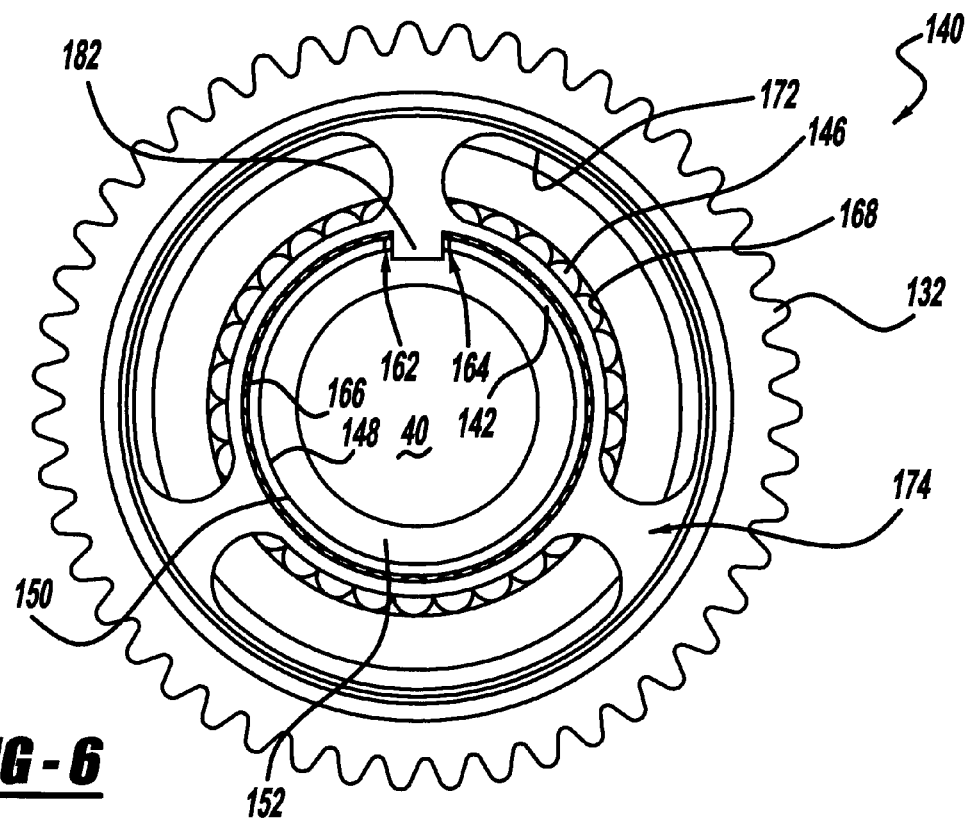
FIG. 6 is a rear end of the clutch assembly shown in FIG. 5.
Figure 7:
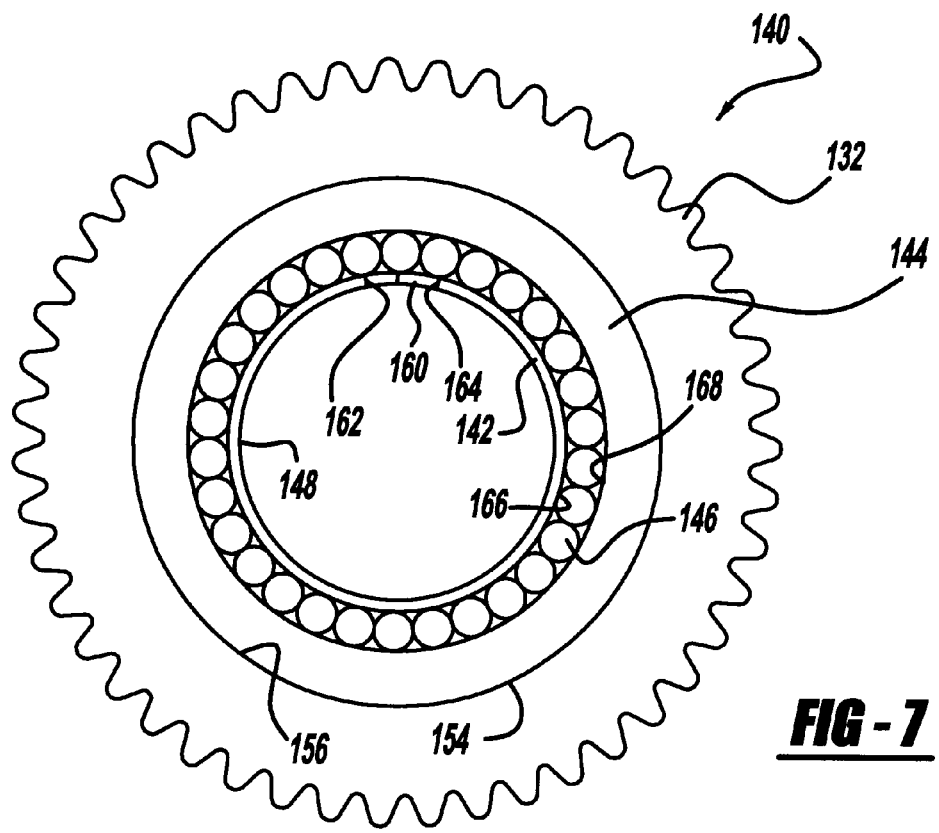
FIG. 7 is a view similar to FIG. 6 except that the actuator ring has been removed from the clutch assembly.
Figure 9:
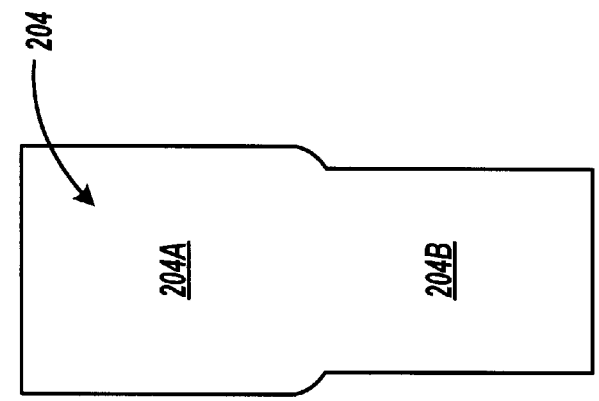
FIG. 9 is a top plan view of the actuator block.

As best seen from FIGS. 5 through 7, mode clutch 46 is controllable, multi-mode, bi-directional overrunning clutch assembly 140 that is operably installed between drive sprocket 132 and rear output shaft 40. In particular, clutch assembly 140 is located within an annular chamber formed in drive sprocket 132 and includes an inner ring 142, an outer ring 144, and a plurality of cylindrical rollers 146. Inner ring 142, hereinafter referred to as a slipper ring, has an inner surface 148 concentrically mounted on an outer surface 150 of an inner rim segment 152 of drive sprocket 132. Likewise, outer ring 144 has an outer surface 154 concentrically aligned in close proximity to an inner surface 156 of an outer rim segment 158 of drive sprocket 132.

Slipper ring 142 is a split ring having an actuation slot 160 defining first and second end surfaces 162 and 164, respectively. A series of arcuate cam track 166 are formed on the outer surface of slipper ring 142 while a corresponding number of arcuate cam tracks 168 are formed in the inner surface of outer ring 144. Rollers 146 are located and retained between aligned sets of cam tracks 166 and 168. As best seen in FIG. 5, outer ring 144 has a plurality of flange segments 170 that extend through apertures 172 formed in an actuator ring 174. Flanges 170 are secured via a spline connection 176 to a drive plate 178 which, in turn, is fixed via a splined connection 180 to rear output shaft 40. Thus, outer ring 144 is driven by rear output shaft 40.

Figure 8B:
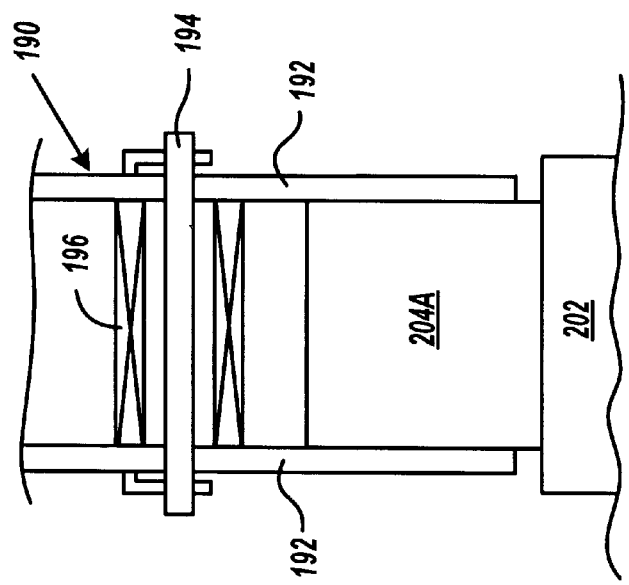
FIGS. 8A and 8B are partial end views of the drag band and actuator block associated with the mode shift mechanism.
Figure 8A:
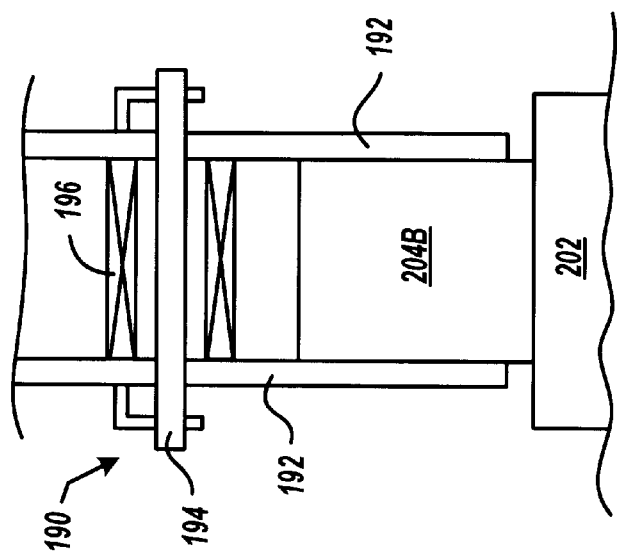

Actuator ring 174 is located between drive sprocket 132 and drive plate 178 and includes a radial lug 182 that is retained within actuation slot 160 of slipper ring 142. Actuator ring 174 also includes a cylindrical rim 184 having an upstanding flange 186 to define a circumferential retention groove. Overrunning clutch assembly 140 further includes a drag band 190 which encircles and engages rim 184 on actuator ring 174 and which is retained within the retention groove. As best seen from FIGS. 8A and 8B, drag band 190 has a pair of ends 192 interconnected by a roll pin 194 and biased by a compression-type coil spring 196 to maintain a predetermined drag force on rim segment 184 of actuator ring 174. Drag band 190 is preferably made of brass or a suitable spring material.

Mode clutch 46 further includes a mode shift mechanism 200 having an actuator block 202 secured to shift rail 114. A contoured camming lug 204 on actuator block 202 is disposed between, and its side surfaces engage, both ends 192 of drag band 190. In addition, spring 196 is arranged to urge band ends 192 into continuous contact with camming lug 204 of actuator block 202. As will be detailed, the contour of camming lug 204 functions to cause ends 192 of drag band 190 to move between a retracted position (FIG. 8A) and an expanded position (FIG. 8B) in response to axial movement of actuator block 202.

Preferably, actuator 54 includes a power-operated device, such as an electric gearmotor 206, which is operable for generating an output torque, the value of which varies as a function of the magnitude of the electrical control signal applied thereto by controller 58. To provide means for selectively controlling coordinated movement of range fork 110 and actuator block 202, actuator 54 also includes a drive mechanism 208. Drive mechanism 208 is interconnected to a rotary output member 210 of gearmotor 206 for changing its output torque into axially-directed forces that are used for controlling axial movement of range fork 110 and cam block 202. According to a preferred construction, drive mechanism 208 includes a sector plate 212 that is rotatably driven through a range of angular motion by output member 210 of gearmotor 206.

To generate axial movement of cam block 202, sector plate 212 includes a mode slot 214 within which a mode pin 216 is retained. Mode pin 216 is fixed to a mode fork 218 which, in turn, is fixed (i.e. pinned) to shift rail 114 for movement therewith. The contour of mode slot 214 is configured to cause the desired direction and amount of axial sliding movement of mode fork 218 and shift rail 114 in response to rotation of sector plate 212. Since actuator block 202 is also fixed to shift rail 114, axial movement of mode fork 184 in response to rotation of sector plate 212 directly controls corresponding axial movement of actuator block 202. A biasing spring 219 is disposed between housing 66 and actuator block 202 which acts to bias mode pin 216 against mode slot 214. To control axial movement of range sleeve 94, sector plate 212 also has a range slot 220 within which a range pin 222 extends. Range pin 222 is fixed to a tubular segment 224 of range fork 110 which is shown supported for sliding movement on shift rail 114. The contour of range slot 220 is configured to cause controlled axial movement of range sleeve 94 between its three distinct range positions in response to rotation of sector plate 212.

According to a preferred embodiment of the present invention, sector plate 212 may be rotated to any one of five distinct sector positions to establish a corresponding number of drive modes. These drive modes include a locked four-wheel high-range drive mode, a full-time four-wheel high-range drive mode, a neutral mode, a locked four-wheel low-range drive mode, and a full-time four-wheel low-range drive mode. The particular four-wheel drive mode selected is established by the position of mode pin 216 in mode slot 214 and the position of range pin 222 in range slot 220. In operation, the vehicle operator selects a desired drive mode via actuation of mode select mechanism 56 which, in turn, sends a mode signal to controller 58 that is indicative of the selection. Thereafter, controller 58 generates an electric control signal that is applied to gearmotor 206 for controlling the rotated position of sector plate 212.

Mode select mechanism 56 can take the form of any mode selector device which is under the control of the vehicle operator for generating a mode signal indicative of the specific mode selected. In one form, the mode selector device may be in an array of dash-mounted push button switches. Alternatively, the mode selector may be a manually-operable shift lever sequentially moveable between a plurality of positions corresponding to the available operational modes which, in conjunction with a suitable electrical switch arrangement, generates a mode signal indicating the selected mode. In either form, mode select mechanism 56 offers the vehicle operator the option of deliberately choosing between the various operative drive modes.

Referring to FIGS. 10A and 10B, sector plate 212 is shown to have five distinct detent positions labeled 4H-LOCK, 4H-AUTO, N, 4L-LOCK and 4L-AUTO. Each detent position corresponds to an available drive mode that can be selected via mode selector 56. In particular, a poppet assembly 226 is shown in FIG. 10A retained in the 4H-LOCK detent of sector plate 212 which represents establishment of the locked four-wheel high-range drive mode wherein range sleeve 94 is located in its H range position and mode fork 218 is located in a first or LOCK mode position. As seen, range pin 222 is located in a high-range dwell section 220A of range slot 220 and mode pin 216 is located in a first section 214A of mode slot 214. With mode fork 218 in its LOCK position, actuator block 202 is positioned such that ends 192 of drag band 190 engage the edge surfaces of a first segment 204A of camming lug 204. With actuator block 202 in this position, ends 192 of drag band 190 are forcibly separated so as to be located in expanded position of FIG. 8B. Such separation of ends 192 of drag band 190 acts to release the circumferential drag force normally exerted on actuator ring 174.

With drag band 190 released from frictional engagement with rim 184 of actuator ring 174, radial lug 182 is positioned centrally in actuation slot 160 of slipper ring 142. When centrally located, the opposite edges of lug 182 are displaced from end segments 162 and 164 of actuation slot 160. As such, relative rotation between front output shaft 30 and rear output shaft 40 in either direction (i.e., front overrunning rear and rear overrunning front) causes a limited amount of relative rotation between slipper ring 142 and outer ring 144. Such limited relative movement causes rollers 146 to ride up the circumferentially indexed cam tracks 166 and 168 which, in turn, causes rollers 146 to exert a radially inwardly directed locking force on slipper ring 142, thereby clamping inner surface 148 of slipper ring 142 to outer surface 150 of drive sprocket 132. Accordingly, clutch assembly 140 is locked and drive sprocket 132 is coupled to rear output shaft 40 such that second gearset 50 is locked and drive torque is transferred from rear output shaft 40 through transfer assembly to front output shaft 30. In effect, front output shaft 30 is coupled to rear output shaft 40 to establish the locked four-wheel drive mode.

Referring to FIG. 10B, poppet assembly 226 is shown retained in the 4H-AUTO detent of sector plate 212 which represents establishment of the full-time four-wheel high-range drive mode wherein range sleeve 94 is still located in its H position and mode fork 218 has moved axially from its LOCK mode position to an AUTO mode position in response to rotation of sector plate 212. Specifically, high-range dwell section 220A of range slot 220 maintains range pin 222 at the same axial location along shift rail 114 during rotation of sector plate 212 in the clockwise direction from the 4H-Lock position to the 4H-AUTO position, thereby maintaining range sleeve 94 in its H position. However, the contour of first segment 214A of mode slot 214 causes movement of mode fork 218 which, in turn, moves actuator block 202 to a position where ends 192 of drag band 190 now engage the side surfaces of a second narrower segment 204B of camming lug 204. Contraction of the distance between ends 192 of drag band 190 acts to re-engage the circumferential drag force exerted by drag band 190 on rim 184 of actuator ring 174. Therefore, initial rotation of the output shafts caused by motive operation of the vehicle results in circumferential indexing of actuator ring 174 relative to outer ring 144 until lug 182 engages one of end surfaces 162 and 164 of actuation slot 160 in slipper ring 142.

For example, if the vehicle is rolling forward, drive sprocket 132 would rotate counter clockwise and the drag exerted by drag band 190 would cause actuator ring 174 to index in a clockwise direction such that lug 182 engage end surface 162 of slot 160. In this position, lug 182 prevents rotation of slipper ring 142 in a first direction (i.e., counter-clockwise) relative to outer ring 144 while permitting limited rotation of slipper ring 142 in a second direction (i.e., clockwise) relative to outer ring 144. Since outer ring 144 is driven by rear output shaft 40, and slipper ring 142 is mounted on drive sprocket 132, clutch assembly 140 is maintained in an unlocked condition during relative rotation in the first direction and automatically locks in response to relative rotation in the second direction. Specifically, with lug 182 located adjacent end surface 162 of slot 160 it maintains alignment between slipper ring 142 and outer ring 144 which acts to maintain rollers 146 centrally located in cam tracks 166 and 168. As such, slipper ring 142 is not frictionally clamped to drive sprocket 132, thereby allowing front output shaft 30 to overrun rear output shaft 40. However, if traction is lost at rear wheels 32 and rear output shaft 40 attempts to overrun front output shaft 30, slipper ring 142 moves in the second direction relative to outer ring 144. This limited relative rotation causes rollers 146 to ride up cam surfaces 166 and 168 which acts to frictionally clamp slipper ring 142 to drive sprocket 132, thereby locking clutch assembly 140. This one-way locking function establishes an automatic full-time four-wheel drive mode during forward motion of the vehicle. The term "automatic" refers to instantaneous locking of clutch assembly 140 in the event of an interaxle slip condition without any input from the vehicle operator. Once the traction loss condition has been eliminated, clutch assembly 140 is self-releasing to return operation to an unlocked mode, whereby the interaxle differential action of second gearset 50 is unrestricted.

During reverse operation of the vehicle, drive sprocket 132 would rotate clockwise and the drag force would cause actuator ring 174 to circumferentially index until lug 182 is located adjacent to end surface 164 of slipper ring 142. This arrangement is the reverse of that described for forward operation such that limited relative rotation is permitted between slipper ring 142 and outer ring 144 in the first direction of relative rotation but prevented in the second direction. This automatic full-time four-wheel drive mode also permits front output shaft 30 to overrun rear output shaft 40 during tight cornering while clutch assembly 140 locks to limit interaxle slip during lost traction at the rear wheels. As such, once the automatic full-time four-wheel drive mode is established, it is operational during both forward and reverse travel of the vehicle.

When it is desired to shift transfer case 20 from its 4H-AUTO mode into its NEUTRAL mode, the mode signal from mode selector 56 is sent to controller 58 which then sends a control signal to electric motor 206 to rotate sector plate 212 until poppet assembly 226 is located in its N detent. Such rotation of sector plate 212 causes range pin 222 to exit high-range dwell section 220A of range slot 220 and travel within a shift section 220B thereof. The contour of shift section 220B causes range fork 110 to move axially on shift rail 114 which causes corresponding movement of range sleeve 94 from its. H position to its N position. Concurrently, mode pin 216 of mode fork 218 exits first section 214A of mode slot 214 and travels within a dwell section 214B thereof which is contoured to maintain mode fork 218 in its AUTO mode position.

When mode selector 56 indicates selection of the locked four-wheel low-range drive mode, sector plate 212 is rotated until poppet assembly 226 is located in the 4L-Lock detent position. Assuming the shift sequence required continued rotation of sector plate 212 in the clockwise direction range pin 222 continues to travel within shift section 220B of range slot 220 which acts to axially move range sleeve 94 from its N position to its L position. Concurrently, mode pin 216 exits dwell section 214B of mode slot 214 and travels within a third section 214C thereof which functions to move mode fork 218 from its AUTO mode position into its LOCK mode position. As previously described, locating mode fork 218 in its LOCK mode position causes a bi-directional locking of clutch assembly 140 to establish the locked four-wheel low-range drive mode.

Upon selection of the full-time four-wheel low-range drive mode, sector plate 212 is rotated until poppet assembly 226 is located in its 4L-AUTO detent. Such rotation of sector plate 212 causes range 222 to travel within a low-range dwell section 220C of range slot 220 so as to maintain range sleeve 94 in its L position. Such rotation of sector plate 212 also causes mode pin 216 of mode fork 218 to ride within a fourth section 214D of mode slot 214 which forcibly urges mode fork 218 to move from its LOCK mode position to its AUTO mode position. As previously described, an automatic full-time four-wheel drive mode is established when mode fork 218 is in its AUTO mode position.

First planetary gearset 48 is arranged to provide a ratio of between 2:1 to 5:1 for its low-range. For example, first planetary gearset 48 establishes a ratio of about 2.6:1 when first sun gear 70 has 55 teeth, ring gear 68 has 89 teeth, and first planet gears 72 each have 17 teeth. Alternately, first planetary gearset 48 can have a first sun gear 70 with 31 teeth while ring gear 68 has 89 teeth and first planet gears 72 each have 29 teeth for defining a 3.9:1 low-range ratio.

Figure 11:
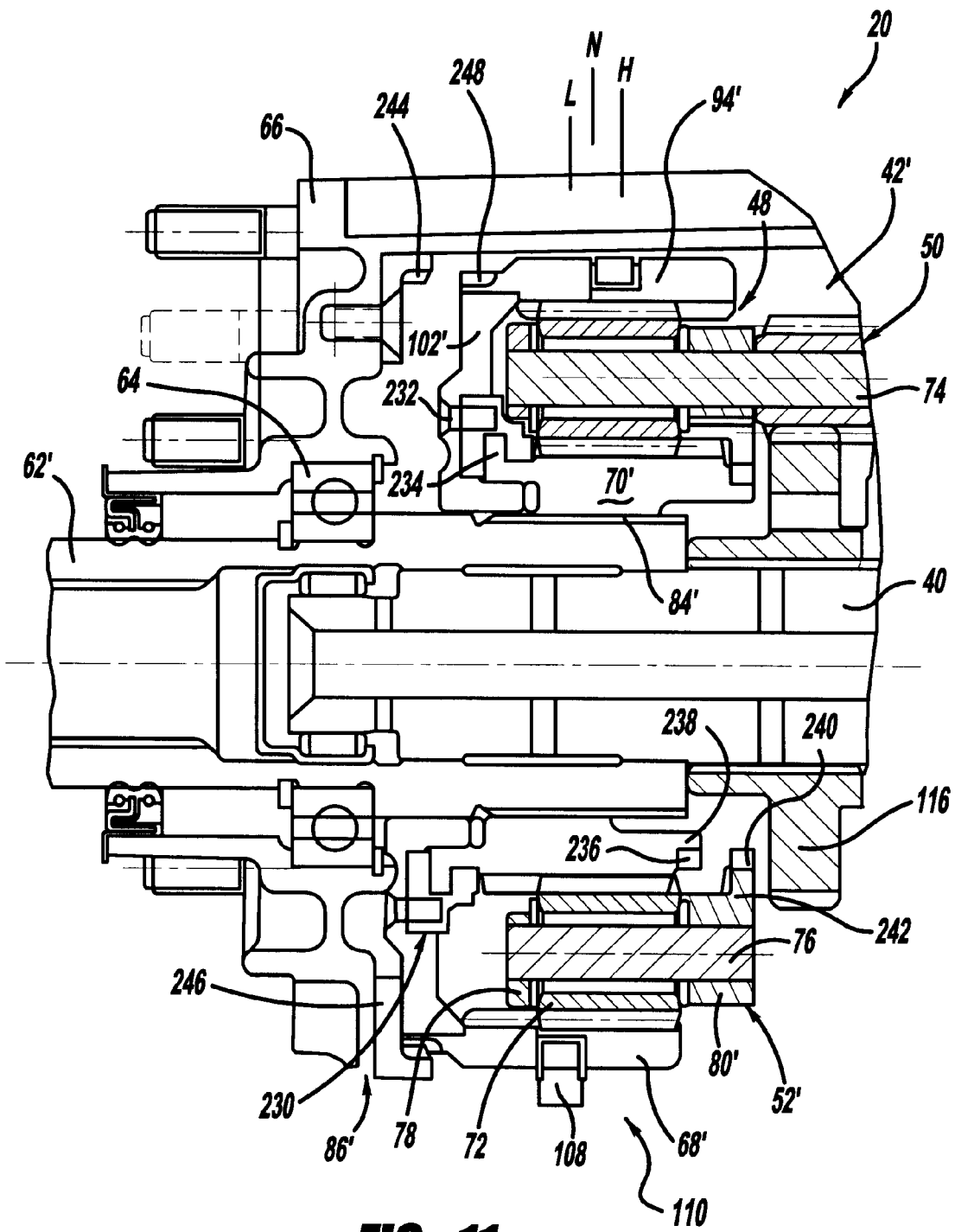
FIG. 11 is a partial sectional view of an alternative preferred embodiment for the integrated planetary gear assembly and the range shift mechanism adapted for use in the full-time power transfer system of the present invention.

Referring now to FIG. 11, an alternative construction for planetary gear assembly 42' and range shift mechanism 86' are shown that are adaptable for use in transfer case 20. In particular, first sun gear 70' is shown to be fixed via spline construction 84' for rotation with and axial sliding movement relative to input shaft 62'. Ring gear 68' has plate segment 102' to which a coupling ring 230 is fixed via bolts 232. A radial flange 234 extending from first sun gear 70' is retained in a circumferential groove formed in coupling ring 230 so as to permit sun gear 70' to rotate relative to ring gear 68'.

Range shift mechanism 86' includes a range sleeve 94' that is integral with ring gear 68' for causing sliding movement of ring gear 68' and first sun gear 70' between three distinct range positions including a low-range, position (L), a neutral position (N), and a high-range position (H). Fork segment 108 of range fork 110 is retained in a groove formed in range sleeve 94' such that sector plate 212 is again used to control axial movement of range fork 110 and thus range sleeve 94'. When range sleeve 94' is in it H position, the high-range drive connection between input shaft 62' and carrier 52' is established. This is shown in the upper-half of FIG. 11 with clutch teeth 236 on a clutch ring 238 that is formed integrally with first sun gear 70' being engaged with clutch teeth 240 on a clutch ring 242 that is formed integrally with carrier ring 80'. Likewise, the low-range drive connection between input shaft 62' and carrier 52' is shown in the lower-half of FIG. 11 with clutch teeth 244 of a clutch ring 246 fixed to housing 66 engaged with clutch teeth 248 formed on ring gear 68' when range sleeve 94' is in its L position. The NEUTRAL mode is established with range sleeve 94' in its N position whereat sun gear 70' is released from coupled engagement with second carrier ring 80' and ring gear 68' is released from braked engagement with housing 66.

Figure 12:
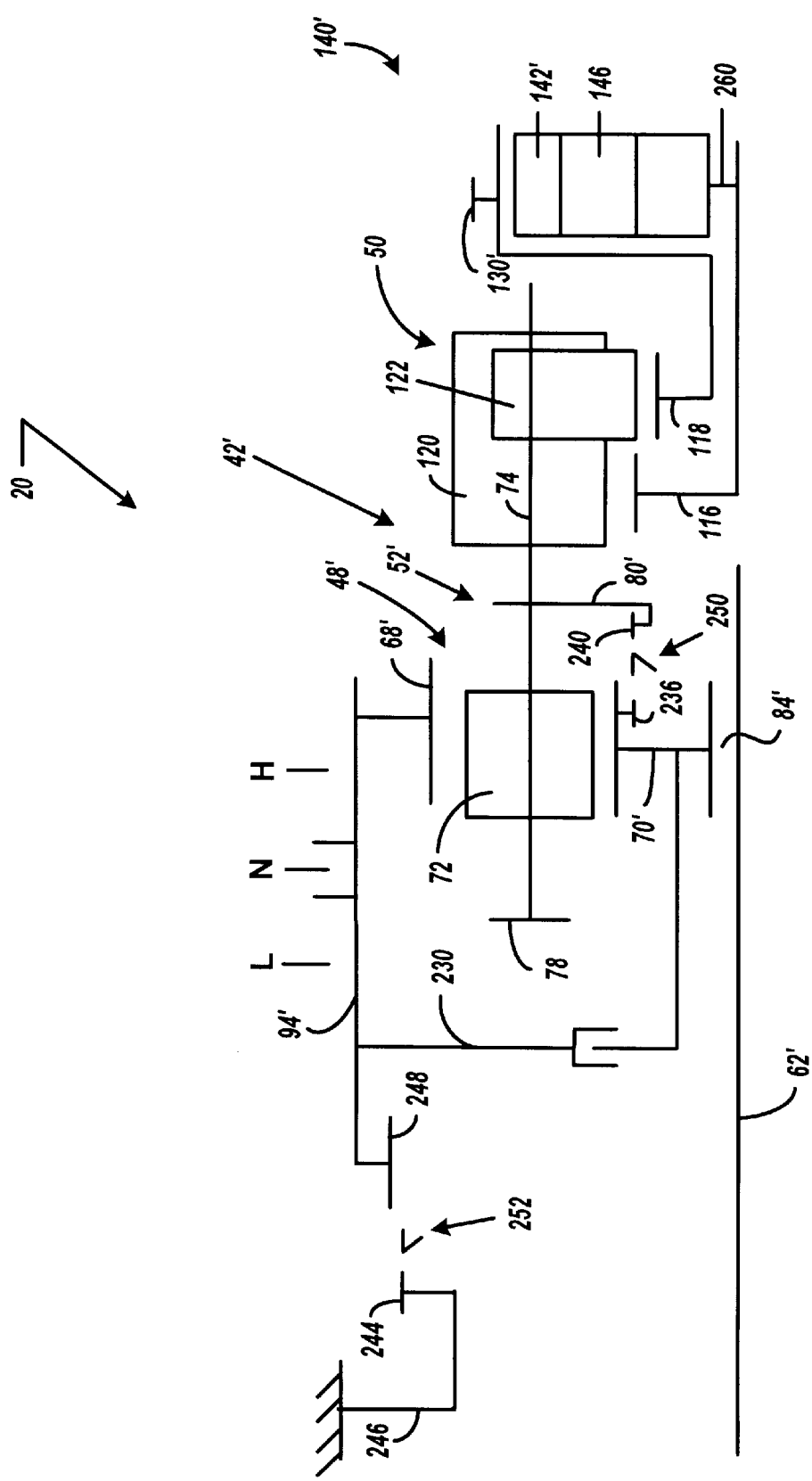
FIG. 12 is a schematic view of synchronized version of the range shift mechanism shown in FIG. 11.
Figure 13:
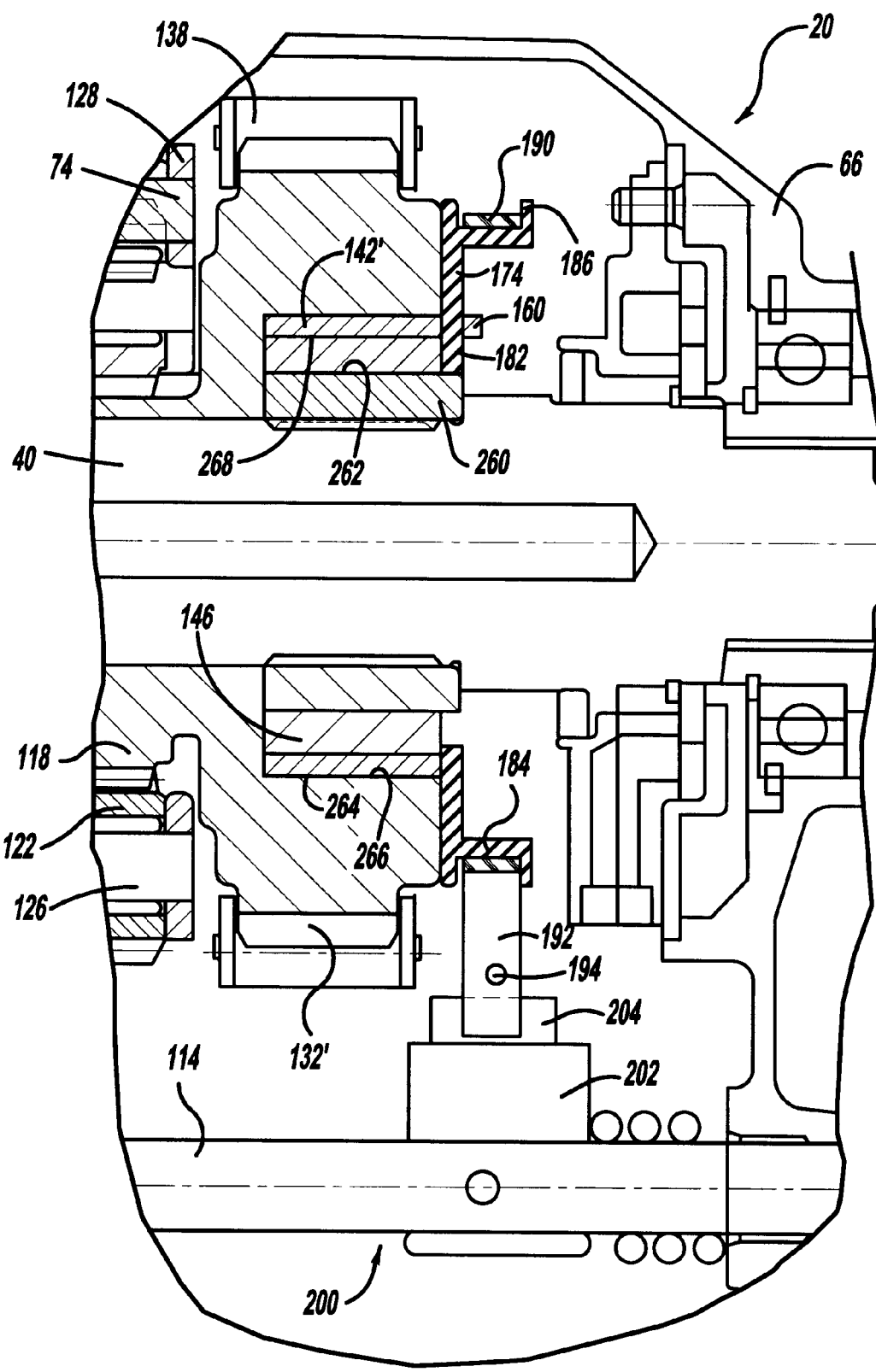
FIG. 13 is a partial sectional view of an alternative preferred embodiment of the multi-mode bi-directional overrunning clutch assembly adapted for use in the full-time transfer cases of the present invention.

FIG. 12 is a schematic illustration of a synchronized version of the range shift arrangement shown in FIG. 11 and a modified arrangement for controllable, bi-directional, overrunning clutch assembly 140' installed in transfer case 20. The synchronized range shift arrangement is shown to include a first or high-range synchronizer 250 operably installed between clutch ring 238 on first sun gear 68' and clutch ring 242 on carrier ring 80'. A second or low-range synchronizer 252 is shown operably disposed between clutch ring 246 and range sleeve teeth 248. Clutch assembly 140' is substantially identical in structure and function to that of clutch assembly 140 except that slipper ring 142' is now positioned above rollers 146. Referring to FIG. 13, a hub 260 is fixed (i.e., splined) for rotation with rear output shaft 40 and has outer cam tracks 262 within which rollers 146 are retained. Slipper ring 142' has an outer surface 264 adjacent an inner surface 266 of sprocket 132' and an inner surface defining a plurality of inner cam tracks 268 within which rollers 144 are also retained. Lug 182 of actuator ring 174 is again retained in actuation slot 160 of slipper ring 142' and drag band 190 surrounds rim 184. Thus, in this arrangement, the need for outer ring 144 and drive plate 178 have been eliminated to provide a simpler and more cost effective clutch assembly.

Figure 14:
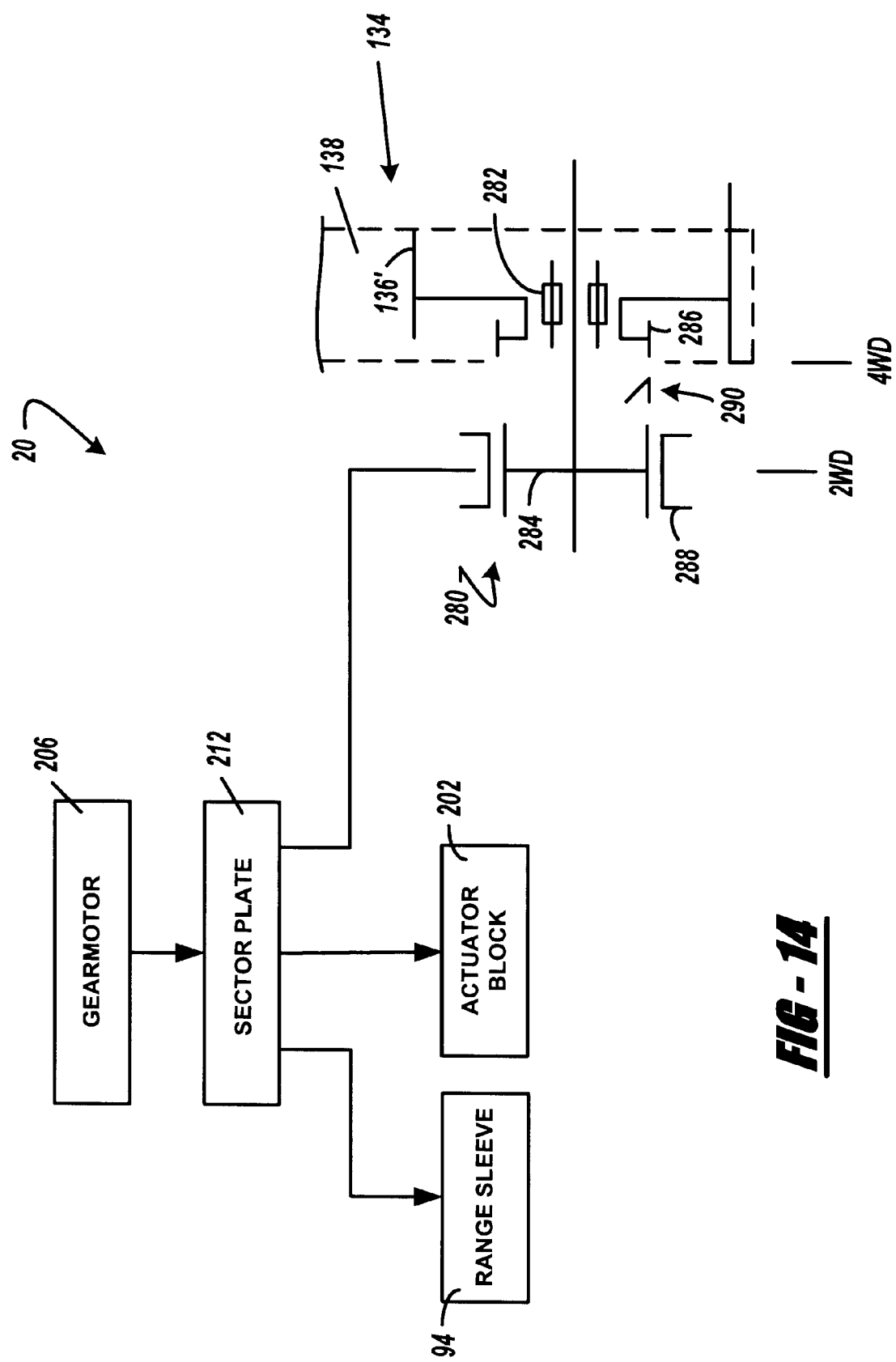
FIG. 14 is a schematic illustration of the transfer case of the present invention equipped with a disconnect clutch assembly.

Referring now to FIG. 14, transfer case 20 is schematically shown to now include a disconnect clutch assembly 280 that is operable to selectively couple driven sprocket 136' to front output shaft 30. In this arrangement, driven sprocket 136' is rotatably supported on front output shaft 30 via a bearing assembly 282. Driven sprocket 136' is continuously driven by drive sprocket 132, 132'. Disconnect clutch assembly 280 is operable in a released mode to establish a two-wheel drive mode wherein all drive torque is transferred to rear output shaft 40. Disconnect clutch assembly 280 is further operable in a locked mode to establish the four-wheel drive mode.

Disconnect clutch assembly 280 includes a hub 284 fixed to front output shaft 30, a clutch ring 286 fixed to driven sprocket 136, a mode sleeve 288 splined for rotation on and sliding movement relative to hub 284, and a synchronizer 290. Mode sleeve 288 is moveable between a two-wheel drive position (2WD) and a four-wheel drive position (4WD) via a second mode fork 292 which is mounted for sliding movement on shift rail 114. Sector plate 212 would be modified to include a second mode slot with a second mode pin retained therein. Second mode pin would be fixed to second mode fork 292 such that rotation of sector plate 212 also controls movement of mode fork 292 between its 2WD and 4WD mode positions. Sector plate 212 would have an additional detent position, identified in phantom in FIG. 10A as 2H-LOCK, where range sleeve 94 would be located in its H position, mode fork 218 would be in its LOCK position, and mode fork 292 would be in its 2WD position. With mode fork 292 in its 2WD position, mode sleeve 288 is released from engagement with clutch ring 286 such that drive torque delivered to transfer assembly 134 is not transferred to front output shaft 30. Mode select mechanism 56 would permit selection of the two-wheel high-range drive mode in addition to the various four-wheel drive modes previously disclosed. When any of the four-wheel drive modes is selected, sector plate rotation causes mode sleeve 288 to move into its 4WD position whereat driven sprocket 136' is coupled to front output shaft 30 and drive torque from transfer assembly 134 is delivered to the front driveline.

The foregoing discussion discloses and describes the preferred embodiments for the present invention. However, one skilled in the art will readily recognize from such discussion, and from the accompanying drawings and claims, that various changes, modifications and variations can be made therein without departing from the true spirit and fair scope of the invention as defined in the following claims.

What is claimed is:

1. A transfer case comprising:

an input shaft;

first and second output shafts;

a planetary gear assembly interconnecting said input shaft to said first and second output shafts and including first and second gearsets having a common carrier, said first gearset including a first sun gear driven by said input shaft, a ring gear, and a first planet gear supported by said carrier and meshed with said first sun gear and said ring gear, said ring gear interconnected to said first sun gear so as to facilitate relative rotation therebetween and movement of said first sun gear in response to movement of said ring gear, said second gearset including a second sun gear connected to said first output shaft, a third sun gear, a second planet gear supported by said carrier and meshed with said second sun gear, and a third planet gear supported by said carrier and meshed with said third sun gear and said second planet gear;

said ring gear moveable between a high-range position and a low-range position to establish corresponding high-range and low-range drive connections between said input shaft and said carrier, said ring gear is operable in its high-range position to couple said first sun gear to said carrier and release said ring gear from coupled engagement with a stationary member, and said ring gear is operable in its low-range position to release said first sun gear from couple engagement with said carrier and couple said ring gear to said stationary member;

a transfer assembly coupling said third sun gear to said second output shaft;

a bi-directional overrunning mode clutch operably disposed between said transfer assembly and said first output shaft including a mode actuator that is moveable between a first position and a second position to establish corresponding AUTO and LOCK modes, said overrunning clutch is operable in its AUTO mode to permit relative rotation between said first and second output shafts in a first direction and prevent relative rotation therebetween in a second direction, and said overrunning clutch is operable in its LOCK mode to prevent relative rotation between said first and second output shafts in both directions; and a shift mechanism for controlling movement of said ring gear and said mode actuator.

2. The transfer case of claim 1 further comprising a first clutch plate fixed to said carrier and a second clutch plate fixed to said stationary member, said ring gear is adapted to engage said second clutch plate when moved to its low-range position and said first sun gear is adapted to engage said first clutch plate when said ring gear is moved to its high-range position.

3. The transfer case of claim 2 further comprising:

a first synchronizer operably disposed between said first sun gear and said first clutch plate for inhibiting movement of said ring gear to its high-range position until speed synchronization is established therebetween; and a second synchronizer operably disposed between said ring gear and said second clutch plate for inhibiting movement of said ring gear to its low-range position until speed synchronization is established therebetween.

4. The transfer case of claim 1 wherein said first sun gear is splined for rotation with and sliding movement on said input shaft, and wherein said first sun gear has a radial flange retained in a circumferential groove formed in a plate segment of said ring gear so as to permit relative rotation therebetween while causing current sliding movement of said first sun gear in response to movement of said ring gear.

5. The transfer case of claim 1 wherein said bi-directional overrunning mode clutch includes a first ring driven by said first output shaft, a second ring, and rollers disposed in aligned cam tracks formed in facing surfaces of said first and second rings, said second ring adapted to circumferentially index relative to said first ring to cause said rollers to ride up said cam tracks and cause said second ring to frictionally engage said transfer assembly.

6. The transfer case of claim 5 wherein said transfer assembly includes a first sprocket rotatably supported on said first output shaft and driven by said third sun gear, and a second sprocket fixed to said second output shaft and operably driven by said first sprocket, said second ring of said mode clutch adapted to releasably engage said first sprocket.

7. The transfer case of claim 6 wherein said first sprocket defines a chamber within which said mode clutch is disposed, said second ring having an outer surface adapted to frictionally engage an inner surface of said chamber.

8. The transfer case of claim 7 wherein said second ring is a split ring defining an actuation slot having first and second edge surfaces, said mode actuator is an actuator ring having a lug retained in said actuation slot of said split ring and which is moveable from a central position disengage from said first and second edge surfaces in a first direction into engagement with said first edge surface and in a second direction into engagement with said second edge surface.

9. The transfer case of claim 8 wherein said actuator ring has a rim on which a drag band is retained, said drag band having a pair of ends between which a cam block is retained, said cam block having a first segment engaging said ends of said drag band so as to cause said drag band to exert a drag force on said rim of said actuator ring which causes circumferential indexing of said actuator ring in response to relative rotation between said first and second rings, said cam block further including a second segment engaging said ends of said drag band so as to release said drag force from said actuator ring.

10. The transfer case of claim 9 wherein said shift mechanism is operable for moving said cam block between a first position whereat its first segment engages said drag band and a second position whereat its second segment engages said drag band.

11. The transfer case of claim 6 wherein said first sprocket defines a chamber within which said mode clutch is disposed, said second ring having an inner surface adapted to frictionally engage an outer surface of said chamber.

12. The transfer case of claim 11 wherein said second ring is a split ring defining an actuation slot having first and second edge surfaces, said mode actuator is an actuator ring having a lug retained in said actuation slot of said split ring which is moveable from a central position disengage from said first and second edge surfaces in a first direction into engagement with said first edge surface and in a second direction into engagement with said second edge surface.

13. The transfer case of claim 12 wherein said actuator ring has a rim on which a drag band is retained, said drag band having a pair of ends between which a cam block is retained, said cam block having a first segment engaging said ends of said drag band so as to cause said drag band to exert a drag force on said rim of said actuator ring which causes circumferential indexing of said actuator ring in response to relative rotation between said first and second rings, said cam block further including a second segment engaging said ends of said drag band so as to release said drag force from said actuator ring.

14. The transfer case of claim 13 wherein said shift mechanism is operable for moving said cam block between a first position whereat its first segment engages said drag band and a second position whereat its second segment engages said drag band.

15. The transfer case of claim 1 further comprising:

an actuator for controlling movement of said shift mechanism;

a mode selector permitting an operator to select one of a full-time high-range drive mode and a locked high-range drive mode; and a controller receiving mode signals from said mode selector and controlling actuation of said actuator in response to said mode signals.

16. The transfer case of claim 15 wherein said actuator includes:

an electric motor having an output rotatably driven in response to control signals from said controller;

a sector plate rotatively driven by said motor output;

a range fork interconnected between said ring gear and said sector plate such that rotation of said sector plate causes movement of said ring gear between its high-range low-range positions; and a mode fork operably interconnected between said mode actuator and said sector plate for causing said movement of said mode actuator in response to rotation of said sector plate so as to shift said mode clutch between its AUTO and LOCK modes.

17. A transfer case comprising:

an input shaft;

first and second output shafts;

a planetary gear assembly interconnecting said input shaft to said first and second output shafts and including first and second gearsets having a common carrier, said first gearset including a first sun gear driven by said input shaft, a ring gear, and a first planet gear supported by said carrier and meshed with said first sun gear and said ring gear, said second gearset including a second sun gear connected to said first output shaft, a third sun gear, a second planet gear supported by said carrier and meshed with said second sun gear, and a third planet gear supported by said carrier and meshed with said third sun gear and said second planet gear, said ring gear is interconnected to said first sun gear to permit concurrent sliding movement between a first position and a second position while allowing relative rotation therebetween;

a transfer assembly coupling said third sun gear to said second output shaft;

a bi-directional overrunning mode clutch operably disposed between said transfer assembly and said first output shaft including a mode actuator that is moveable between a first position and a second position to establish corresponding AUTO and LOCK modes, said overrunning clutch is operable in its AUTO mode to permit relative rotation between said first and second output shafts in a first direction and prevent relative rotation therebetween in a second direction, and said overrunning clutch is operable in its LOCK mode to prevent relative rotation between said first and second output shafts in both directions;

a range shift mechanism for moving said ring gear between its first and second positions to establish high-range and low-range drive connections between said input shaft and said carrier, said high-range connection is established when said ring gear is in its first position whereat said first sun gear is coupled to said carrier and said ring gear is released from engagement with a stationary member and said low-range drive connection is established when said ring gear is in its second position whereat said ring gear is coupled to said stationary member and said first sun gear is released from engagement with said carrier; and a mode shift mechanism for moving said ring gear between its first and second positions.

18. The transfer case of claim 17 wherein said bi-directional overrunning mode clutch includes a first ring driven by said first output shaft, a second ring, and rollers disposed in aligned cam tracks formed in facing surfaces of said first and second rings, said second ring adapted to circumferentially index relative to said first ring to cause said rollers to ride up said cam tracks and cause said second ring to frictionally engage said transfer assembly.

19. The transfer case of claim 18 wherein said transfer assembly includes a first sprocket that is rotatably supported on said first output shaft and driven by said third sun gear, and a second sprocket that is fixed to said second output shaft and operably driven by said first sprocket, and wherein said second ring of said mode clutch is adapted to releasably engage said first sprocket.

20. The transfer case of claim 19 wherein said first sprocket defines a chamber within which said mode clutch is disposed, said second ring having an outer surface adapted to frictionally engage an inner surface of said chamber.

21. The transfer case of claim 20 wherein said second ring is a split ring defining an actuation slot having first and second edge surfaces, said mode shift mechanism including an actuator ring having a lug retained in said actuation slot of said split ring and which is moveable from a central position disengage from said first and second edge surfaces in a first direction into engagement with said first edge surface and in a second direction into engagement with said second edge surface.

22. The transfer case of claim 21 wherein said actuator ring has a rim on which a drag band is retained, said drag band having a pair of ends between which a cam block is retained, said cam block having a first segment engaging said ends of said drag band so as to cause said drag band to exert a drag force on said rim of said actuator ring which causes circumferential indexing of said actuator ring in response to relative rotation between said first and second rings, said cam block further including a second segment engaging said ends of said drag band so as to release said drag force from said actuator ring.

23. The transfer case of claim 22 wherein said mode shift mechanism is operable for moving said cam block between a first position whereat its first segment engages said drag band and a second position whereat its second segment engages said drag band.

24. The transfer case of claim 19 wherein said first sprocket defines a chamber within which said mode clutch is disposed, said second ring having an inner surface adapted to frictionally engage an outer surface of said chamber.

25. The transfer case of claim 24 wherein said second ring is a split ring defining an actuation slot having first and second edge surfaces, said mode shift mechanism including an actuator ring having a lug retained in said actuation slot of said split ring which is moveable from a central position disengage from said first and second edge surfaces in a first direction into engagement with said first edge surface and in a second direction into engagement with said second edge surface.

26. The transfer case of claim 25 wherein said actuator ring has a rim on which a drag band is retained, said drag band having a pair of ends between which a cam block is retained, said cam block having a first segment engaging said ends of said drag band so as to cause said drag band to exert a drag force on said rim of said actuator ring which causes circumferential indexing of said actuator ring in response to relative rotation between said first and second rings, said cam block further including a second segment engaging said ends of said drag band so as to release said drag force from said actuator ring.

27. The transfer case of claim 26 wherein said mode shift mechanism is operable for moving said cam block between a first position whereat its first segment engages said drag band and a second position whereat its second segment engages said drag band.

28. A transfer case comprising:
an input shaft;
a planetary gearset having a sun gear driven by said input shaft, a ring gear, and planet gears rotatably supported by a carrier and meshed with said sun gear and ring gear, said ring gear interconnected to said sun gear so as to permit relative rotation therebetween and cause movement of said sun gear in response to movement of said ring gear between a first position and a second position, said ring gear operable in its first position to couple said sun gear to said carrier and establish a first ratio drive connection between said input shaft and said carrier, and said ring gear is operable in its second position to release said sun gear from engagement with said carrier and establish a second ratio drive connection between said input shaft and said carrier;
an interaxle differential having an input driven by said carrier, a first output driving said first output shaft, and a second output driving said second output shaft;
an overrunning mode clutch operably disposed between said first output shaft and said second output shaft including a mode actuator that is moveable between a first position and a second position to establish corresponding AUTO and LOCK modes, said overrunning mode clutch is operable in its AUTO mode to permit relative rotation between said first and second output shafts in a first direction and prevent relative rotation therebetween in a second direction, and said overrunning mode clutch is operable in its LOCK mode to prevent relative rotation between said first and second output shafts in both directions; and a shift mechanism for controlling movement of said ring gear and said mode actuator.

29. The transfer case of claim 28 further comprising:

a firs synchronizer for inhibiting movement of said ring gear to its first position until speed synchronization is established between said sun gear and said carrier; and a second synchronizer for inhibiting movement of said ring gear to its second position until speed synchronization is established between said ring gear and a stationary member.

30. The transfer case of claim 29 wherein said first output of said interaxle differential is a second sun gear, said second output of said interaxle differential is a third sun gear, and wherein said interaxle differential further includes gear means rotatably supported on said carrier and meshed with said second and third sun gears so as to permit relative rotation therebetween.

31. The transfer case of claim 28 wherein said sun gear is splined for rotation with and sliding movement on said input shaft, and wherein said sun gear has a radial flange retained in a circumferential groove formed in a plate segment of said ring gear so as to permit relative rotation therebetween while causing current sliding movement of said sun gear in response to sliding movement of said ring gear between its first and second positions.

32. The transfer case of claim 28 wherein said overrunning mode clutch includes a first ring driven by said first output shaft, a second ring, and rollers disposed in aligned cam tracks formed in facing surfaces of said first and second rings, said second ring adapted to circumferentially index relative to said first ring to cause said rollers to ride up said cam tracks and cause second ring to frictionally engage said second output shaft.

33. The transfer case of claim 32 further comprising a transfer assembly having a first sprocket rotatably supported on said first output shaft and driven by said second output of said interaxle differential, and a second sprocket fixed to said second output shaft and operably driven by said first sprocket, said second ring of said mode clutch adapted to releasably engage said first sprocket.

34. The transfer case of claim 33 wherein said first sprocket defines a chamber within which said mode clutch is disposed, said second ring having a surface adapted to frictionally engage a complimentary surface of said chamber.

35. The transfer case of claim 34 wherein said second ring is a split ring defining an actuation slot having first and second edge surfaces, said mode actuator is an actuator ring having a lug retained in said actuation slot of said split ring and which is moveable from a central position disengage from said first and second edge surfaces in a first direction into engagement with said first edge surface and in a second direction into engagement with said second edge surface.

36. The transfer case of claim 35 wherein said actuator ring has a rim on which a drag band is retained, said drag band having a pair of ends between which a cam block is retained, said cam block having a first segment engaging said ends of said drag band so as to cause said drag band to exert a drag force on said rim of said actuator ring which causes circumferential indexing of said actuator ring in response to relative rotation between said first and second rings, said cam block further including a second segment engaging said ends of said drag band so as to release said drag force from said actuator ring.

37. The transfer case of claim 36 wherein said shift mechanism is operable for moving said cam block between a first position whereat its first segment engages said drag band and second position whereat its second segment engages said drag band.

38. The transfer case of claim 28 further comprising:

an actuator for controlling movement of said shift mechanism;

a mode selector permitting selection of one of a full-time high-range drive mode and a locked high-range drive mode; and a controller receiving mode signals from said mode selector and controlling actuation of said actuator in response to said mode signals.

39. The transfer case of claim 38 wherein said actuator includes:

an electric motor having an output rotatably driven in response to control signals from said controller;

a cam rotatively driven by said motor output;

a range fork interconnected between said ring gear and said cam such that rotation of said cam causes movement of said ring gear between its first and second positions; and a mode fork operably interconnected between said mode actuator and said cam for causing movement of said mode actuator in response to rotation of said cam so as to shift said mode clutch between its AUTO and LOCK modes.

* * * * *